US012465861B2

(12) United States Patent
Fu

(10) Patent No.: US 12,465,861 B2
(45) Date of Patent: Nov. 11, 2025

(54) VIRTUAL RESOURCE TRANSFER METHOD, APPARATUS, DEVICE, AND STORAGE MEDIUM

(71) Applicant: NETEASE (HANGZHOU) NETWORK CO., LTD., Zhejiang (CN)

(72) Inventor: Jingyi Fu, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 18/279,237

(22) PCT Filed: Jul. 25, 2022

(86) PCT No.: PCT/CN2022/107688
§ 371 (c)(1),
(2) Date: Aug. 29, 2023

(87) PCT Pub. No.: WO2023/173644
PCT Pub. Date: Sep. 21, 2023

(65) Prior Publication Data

US 2024/0278124 A1 Aug. 22, 2024

(30) Foreign Application Priority Data

Mar. 17, 2022 (CN) ......................... 202210267773.0

(51) Int. Cl.
*A63F 13/79* (2014.01)
*A63F 13/537* (2014.01)

(52) U.S. Cl.
CPC ............ *A63F 13/79* (2014.09); *A63F 13/537* (2014.09)

(58) Field of Classification Search
None
See application file for complete search history.

(56) References Cited

U.S. PATENT DOCUMENTS

2017/0232348 A1* 8/2017 Williams ................ A63F 13/22 463/31
2019/0282906 A1* 9/2019 Yong .................. G06Q 20/0658
(Continued)

FOREIGN PATENT DOCUMENTS

CN 108335088 A 7/2018
CN 108830572 A 11/2018
(Continued)

OTHER PUBLICATIONS

International Search Report and Written Opinion with regard to PCT/CN2022/107688 mailed Dec. 12, 2022.
(Continued)

*Primary Examiner* — Jason T Yen
(74) *Attorney, Agent, or Firm* — BCF LLP

(57) ABSTRACT

The present disclosure provides a virtual resource transfer method, apparatus, device and storage medium, the method includes: in response to a controlling instruction on a virtual object, controlling the virtual object to acquire virtual resources in an in-round game scene, and storing the virtual resources in an in-round storage system; in response to a target prop opening instruction, displaying virtual resource items corresponding to the virtual resources in the in-round storage system; in response to a selection operation for the virtual resource items, selecting at least one target virtual resource from the virtual resource items; and controlling a transfer of the target virtual resource from the in-round storage system to an out-round storage system before the current game task is completed. The disclosure saves the resources of the in-round storage system, improves the computer processing efficiency, and improves the smoothness of the current running game.

20 Claims, 8 Drawing Sheets

200

(56) References Cited

U.S. PATENT DOCUMENTS

| | | | | |
|---|---|---|---|---|
| 2020/0387878 | A1 | 12/2020 | Jones et al. | |
| 2022/0044214 | A1 | 2/2022 | Sun et al. | |
| 2022/0168656 | A1* | 6/2022 | Liu | A63F 13/55 |
| 2024/0001237 | A1* | 1/2024 | Luo | A63F 13/87 |

FOREIGN PATENT DOCUMENTS

| | | | |
|---|---|---|---|
| CN | 111881276 | A | 11/2020 |
| CN | 112494943 | A | 3/2021 |
| CN | 113730809 | A | 12/2021 |
| CN | 113730907 | A | 12/2021 |
| CN | 114632325 | A | 6/2022 |

OTHER PUBLICATIONS

English Abstract for CN108335088 retrieved on Espacenet on Aug. 28, 2023.
English Abstract for CN108830572 retrieved on Espacenet on Aug. 28, 2023.
English Abstract for CN111881276 retrieved on Espacenet on Aug. 28, 2023.
English Abstract for CN112494943 retrieved on Espacenet on Aug. 28, 2023.
English Abstract for CN113730809 retrieved on Espacenet on Aug. 28, 2023.
English Abstract for CN114632325 retrieved on Espacenet on Aug. 28, 2023.
English Abstract for CN113730907 retrieved on Espacenet on Aug. 28, 2023.

* cited by examiner

200

200

200

200

VIRTUAL RESOURCE TRANSFER METHOD, APPARATUS, DEVICE, AND STORAGE MEDIUM

CROSS-REFERENCE TO RELEVANT APPLICATIONS

The present disclosure is the U.S. National Stage Application of International Application No. PCT/CN2022/107688, filed on Jul. 25, 2022, which is based upon and claims priority to Chinese patent application No. 202210267773.0 filed on Mar. 17, 2022 and entitled "VIRTUAL RESOURCE TRANSFER METHOD, APPARATUS, DEVICE, AND STORAGE MEDIUM", the entire content of both of which is hereby incorporated reference for all purposes.

TECHNICAL FIELD

The present disclosure relates to the technical field of electronic games, and more particularly, to a virtual resource transfer method, apparatus, device, and storage medium.

BACKGROUND

At present, in many First-person shooting (FPS) games, an in-round-evacuation play method is gradually developed, that is, some props picked up in a round of the game may be taken out of the round of the game, and the taken-out props may be used as other develop-related plays out of the round of the game.

SUMMARY

The present disclosure provides a virtual resource transfer method device and storage medium.

The present disclosure provides a virtual resource transfer method, including: in response to a controlling instruction on a virtual object, controlling, by an electronic device, the virtual object to acquire virtual resource in an in-round game scene, and storing the virtual resource in an in-round storage system, where an in-round game interface displayed by the electronic device corresponds to a current game task, the in-round game interface includes the in-round game scene, and the virtual object located in the in-round game scene; in response to an opening instruction on a target prop, displaying a virtual resource item corresponding to the virtual resource in the in-round storage system: in response to a selection operation on the virtual resource item, selecting at least one target virtual resource from the virtual resource item; and controlling a transfer of the target virtual resource from the in-round storage system to an out-round storage system before the current game task is completed.

The present disclosure further provides an electronic device, including: a memory, configured for storing a computer program; and a processor, configured for executing the computer program to implement a virtual resource transfer method, with the virtual resource transfer method including: in response to a controlling instruction on a virtual object, controlling the virtual object to acquire virtual resource in an in-round game scene, and storing the virtual resource in an in-round storage system, where an in-round game interface displayed by the electronic device corresponds to a current game task, the in-round game interface includes the in-round game scene, and the virtual object located in the in-round game scene; in response to an opening instruction on a target prop, displaying a virtual resource item corresponding to the virtual resource in the in-round storage system; in response to a selection operation on the virtual resource item, selecting at least one target virtual resource from the virtual resource item; and controlling a transfer of the target virtual resource from the in-round storage system to an out-round storage system before the current game task is completed.

The present disclosure further provides a non-transitory electronic device readable storage medium, including: a program, when run by an electronic device, enables the electronic device to implement a virtual resource transfer method, with the virtual resource transfer method including: in response to a controlling instruction on a virtual object, controlling the virtual object to acquire virtual resource in an in-round game scene, and storing the virtual resource in an in-round storage system, where an in-round game interface displayed by the electronic device corresponds to a current game task, the in-round game interface includes the in-round game scene, and the virtual object located in the in-round game scene; in response to an opening instruction on a target prop, displaying a virtual resource item corresponding to the virtual resource in the in-round storage system; in response to a selection operation on the virtual resource item, selecting at least one target virtual resource from the virtual resource item; and controlling a transfer of the target virtual resource from the in-round storage system to an out-round storage system before the current game task is completed.

BRIEF DESCRIPTION OF DRAWINGS

In order to describe the embodiments of the present disclosure more clearly, the accompanying drawings required for describing the embodiments of the present disclosure are briefly introduced in the following. It should be understood that the following drawings illustrate only certain embodiments of the present disclosure and are therefore not to be considered limiting of the scope. For a person of ordinary skill in the art, other related drawings may also be obtained according to these drawings without creative efforts.

DETAILED DESCRIPTION

Figure 1:
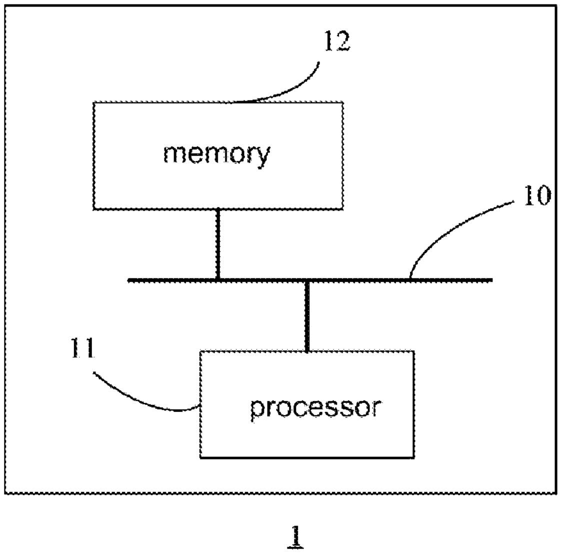
FIG. 1 is a schematic structural diagram of an electronic device according to an embodiment of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry;" "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

As shown in FIG. 1, the present embodiment provides an electronic device 1, including: at least one processor 11 and a memory 12. In FIG. 1, one processor is taken as an example. The processor 11 and the memory 12 are connected via a bus 10. The memory 12 stores an instruction that may be executed by the processor 11, and the instruction is executed by the processor 11 to enable the electronic device 1 to execute all or a part of the processes of the method in the following embodiments, thereby implementing that a player in a round of the game may transfer a target virtual resource, picked up in a backpack of the player, out of the round of the game in advance at anytime and anywhere by using target props.

In an embodiment, the electronic device 1 may be a device such as a mobile phone, a tablet computer, a notebook computer, and a desktop computer, or a large-scale computing system composed of a plurality of computer devices.

First, the terms involved in the embodiments of the present disclosure are basically interpreted as:

Virtual scene: it is a virtual scene displayed (or provided) when an application program is run in a terminal. The virtual scene may be a real-world simulated environment scene, a semi-simulated semi-phantom three-dimensional environment scene, and may also be a purely fictional three-dimensional environment scene. The virtual scene may be any one of a two-dimensional virtual scene, a two-and-half-dimensional virtual scene, and a three-dimensional virtual scene. The following embodiments are described by taking a three-dimensional virtual scene as an example for the virtual scene, but it is not limited thereto.

In some examples, the virtual scene may also be used for a virtual scene fight between at least two virtual characters.

In some examples the virtual scene may also be used to fight with virtual firearms between at least two virtual characters.

In some examples, the virtual scene may also be used to fight with virtual firearms between at least two virtual characters in a target region range, where the target region range becomes smaller as time passes in the virtual scene.

Figure 2A:
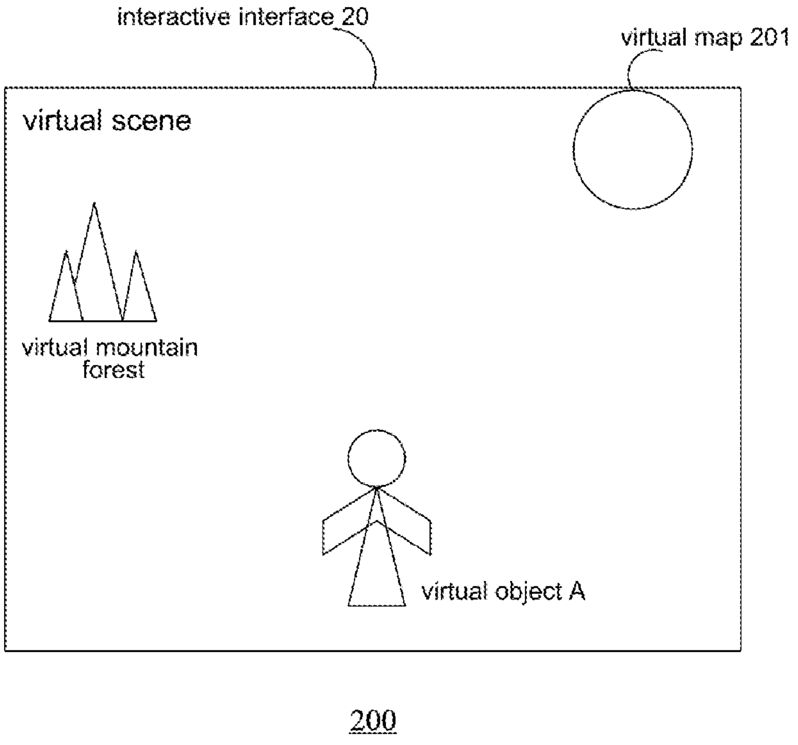
FIG. 2A is a schematic diagram of a virtual scene according to an embodiment of the present disclosure.

In an embodiment, as shown in FIG. 2, a virtual scene 200 may be generated by an application program in a computer device such as the electronic device 1, and may be displayed in the basis of hardware (such as a screen) in the electronic device 1.

In an embodiment, a virtual map 201 may be provided in the virtual scene 200, and virtual geographical position information about the virtual scene 200 is configured in the virtual map 201. A reduced virtual map 201 may be displayed in an interactive interface 20.

Virtual object: it refers to an active object and an inactive object in the virtual scene 200. The active object may be at least one of a virtual person, a virtual animal, and a virtual vehicle. The inactive object may be an object such as a virtual plant, a virtual mountain forest, and a virtual river. As shown in FIG. 2, a virtual object A (player A) takes a virtual person as an example.

In some examples, when the virtual scene 200 is a three-dimensional virtual scene 200, the virtual object is a three-dimensional stereo model created based on animation skeletal technology. Each virtual object has its own shape, volume, and orientation in the three-dimensional virtual scene 200 and occupies a portion of the space in the three-dimensional virtual scene 200.

Virtual props: it refers to virtual resource used to fight between virtual objects in the virtual scene 200, such as a virtual firearm and a virtual knife, and it may also be a borrowing tool that may be used by a virtual object, such as hook props.

In the embodiment of the present disclosure, the virtual scene 200 may be a three-dimensional virtual scene 200; alternately, the virtual scene 200 may also be a two-dimensional virtual scene 200.

With the virtual scene 200 being a three-dimensional virtual scene 200 as an example, please refer to FIG. 2, which shows a schematic diagram of an interactive interface 20 of the virtual scene 200 provided in an exemplary embodiment of the present disclosure. As shown in FIG. 2, the interactive interface 20 of the virtual scene 200 includes a scene screen, and the scene screen includes a virtual object A, a scenic screen of the three-dimensional virtual scene 200, and other virtual objects. Herein, the virtual object A may be a current virtual object of the player corresponding to the electronic device 1, and the scene screen may further include a virtual object of the player corresponding to another electronic device or a virtual object controlled by artificial intelligence.

In an embodiment, the interactive interface 20 may further include a virtual operation control, and the virtual operation control is configured to control a motion state of the virtual object, for example, to control operations such as crosshair movement, jumping, movement, and shooting of the virtual object.

The electronic device 1 in the embodiment of the present disclosure may be a desktop computer, a laptop portable computer, a mobile phone, a tablet computer, an e-book reader, a Moving Picture Experts Group Audio Layer III (MP3) player, a Moving Picture Experts Group Audio Layer IV (MP4) player, or the like. An application supporting a virtual environment, such as an application supporting a three-dimensional virtual environment, is installed and run in the electronic device 1. The application program may be any one of a virtual reality application program, a three-dimensional map program, a military simulation program, a TPS game, an FPS game, and a MOBA game. In some examples, the application program may be a stand-alone application program, such as a stand-alone 3D game program, or an online application program. The electronic device 1 in the embodiment of the present disclosure may include an operating system and an application program. The operating system is basic software for providing secure access to computer hardware for the application program.

The application program is an application program that supports the virtual environment. In some examples, the application program is an application program that supports a three-dimensional virtual environment. The application program may be any one of a virtual reality application program, a three-dimensional map program, a military simulation program, a Third-Personal Shooting Game (TPS), a First-Person Shooting Game (FPS), a MOBA game, and a multiplayer shooting survival game. The application program may be a stand-alone application program, such as a stand-alone 3D game program.

In an embodiment, the processor 11 of the electronic device 1 may generate the virtual scene 200 by executing or invoking the program codes and data stored in the memory 12, and display the generated virtual scene 200 by an outside output/input device. In a process of displaying the virtual scene 200, a capacitive touch control system may be used to detect a touch control operation performed by a user when interacting with the virtual scene 200, and an external keyboard may also be used to detect an interactive operation between the user and the virtual scene 200.

The method provided in the embodiment of the present disclosure may be realized through executing a corresponding software code by the electronic device 1, and is realized by performing data interaction with a server. Herein, the electronic device 1 may be a local terminal device. When the virtual resource transfer method runs in a server, the method may be implemented and executed based in a cloud interaction system, where the cloud interaction system includes a server and a client device.

In some examples according to the present disclosure, various cloud applications may run under a cloud interaction system, such as a cloud game. Taking a cloud game as an example, the cloud game refers to a cloud computing-based game mode. A running subject and a game picture presentation subject of a game program are separated, and storage and operation of a virtual resource transfer method are completed in a cloud game server, where the role of the client device is for reception and transmission of data and presentation of game screens, for example, the client device may be a display device with a data transmission function close to a user side, such as a mobile terminal, a television, a computer, a handheld computer, etc.; however, the electronic device that performs information processing is a cloud game server in the cloud. When playing a game, a player operates a client device to send an operation instruction to a cloud game server, the cloud game server runs the game according to the operation instruction, encodes and compresses data such as game screens, and returns it to the client device via a network. Finally, the game screens are decoded and output by the client device.

In some examples according to the present disclosure, taking a game as an example, the local electronic device stores a game program and is configured for presenting game screens. The local electronic device is configured for interacting with a player via a graphical interface, that is, conventionally downloading and installing a game program via an electronic device and running the game program. The local electronic device may provide the player with a graphical user interface in various manners, for example, the graphical user interface may be rendered and displayed in a display screen of the terminal, or may be provided to the player by means of holographic projection. For example, the local electronic device may include a display screen and a processor, where the display screen is configured for presenting the graphical user interface including game screens, and the processor is configured for running the game, generating the graphical user interface, and controlling the display of the graphical user interface in the display screen.

In an embodiment, an in-round game interface corresponding to a current game task may be displayed by an electronic device, where the in-round game interface includes an in-round game scene, and a virtual object located in the in-round game scene.

In-round game scene: some electronic games, especially battle games, may include a plurality of single-games. Two or more player characters may battle in a single round of the game, and the single-game is the core experiences of this the type of game. The in-round game scene refers to a game scene or a game environment in which the player character is located in the single-round of the battle game, and the player character may fight, cast the skill, win the single-game, etc. in the in-round game scene.

Out-round game scene: it is relative to the in-round game scene, and refers to a game environment other than a single round of the game in an electronic game. The out-round game scene is a support and assistance of the electronic game. A player may know game knowledge, obtain a skin of a character, prepare for a battle, contact with other players for making friends, etc. in the out-round game scene. Taking the virtual scene 200 of the FPS game as an example, the in-round-evacuation play method emerges gradually, that is, some virtual props picked up in the round of the game may be taken out of the round of the game, and the taken-out virtual props may be used as other develop-related plays out of the round of the game.

Generally; there are two traditional ways to take the props out of the round of the game:

1. Setting several fixed evacuation points in the round of the game, when a player gets in the round of the game, relevant information about evacuation points may appear in the upper right corner of the interactive interface 20. The number of the evacuation points may be opened with the game play time, when the player picks up a virtual prop in the round of the game, everything that are picked up into the backpack may be taken out of the round of the game (here, pick-up includes virtual props dropped by the game system and virtual props obtained by killing enemies). When the player enters the fixed evacuation point in the round of the game, prompts may be shown in the interactive interface 20. As long as the player stays in the evacuation point until the time limit is met, then the player may evacuate the game. After the evacuation is successful, the settlement interface may list a list of the virtual props picked up in the round of the game that may be taken out of the round of the game, which are the trophies belonging to the player.
2. the player defeats all the players in the round of the game and wins the first place, then the player may take out the props that may be taken out of the round of the game. In this game scene, the player is clearly informed the address of the evacuation point, and for the virtual props picked up by the player in the round of the game, everything picked up into the backpack may be taken out of the round of the game (here, the pick-up includes virtual props dropped by the game system and virtual props obtained by killing enemies). When the player enters a fixed evacuation point in the round of the game, prompts may be shown in the interface. As long as the player stays in the evacuation point until the time limit is met, then the player may evacuate the game. After the evacuation is successful, the settlement interface may list a list of the virtual props picked up in the round of the game that may be taken out of the round of the game, which are the trophies belonging to the player.

In the above technical solution of taking the props out of the round of the game, the draw back is that although the player may eventually take the props out of the round of the game, the processing of both in-round resources and out-round resources requires frequent data interaction between the processor and the memory, which brings huge storage pressure and data interaction pressure to the electronic device. Moreover, for the user and player, the above methods are very risky due to gambling, since the player may only go to a fixed evacuation point or win the first place to take the picked-up props out of the round of the game, and the opportunity to interact with the players is less, which reduces the confidence of the player to participate in the round of the game interaction.

Figure 2B:
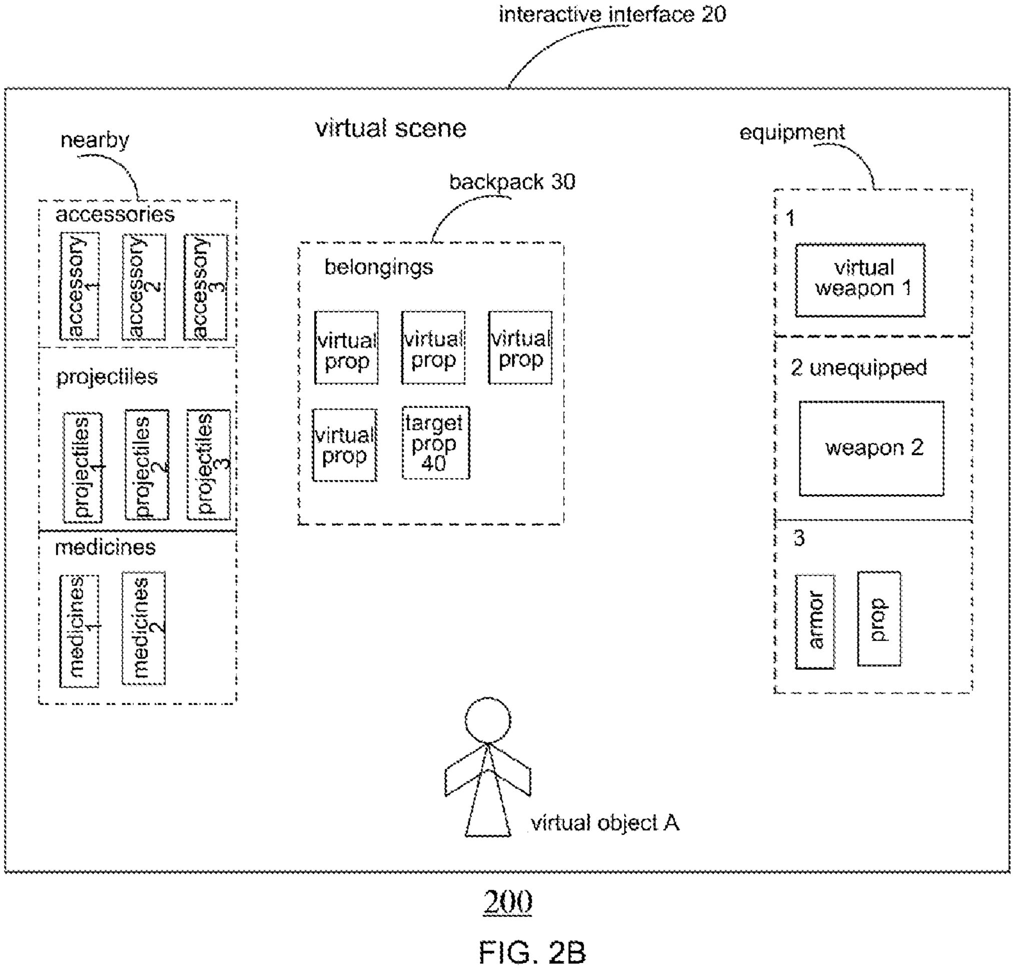
FIG. 2B is a schematic diagram of an interactive interface of a virtual scene according to an embodiment of the present disclosure.
Figure 3:
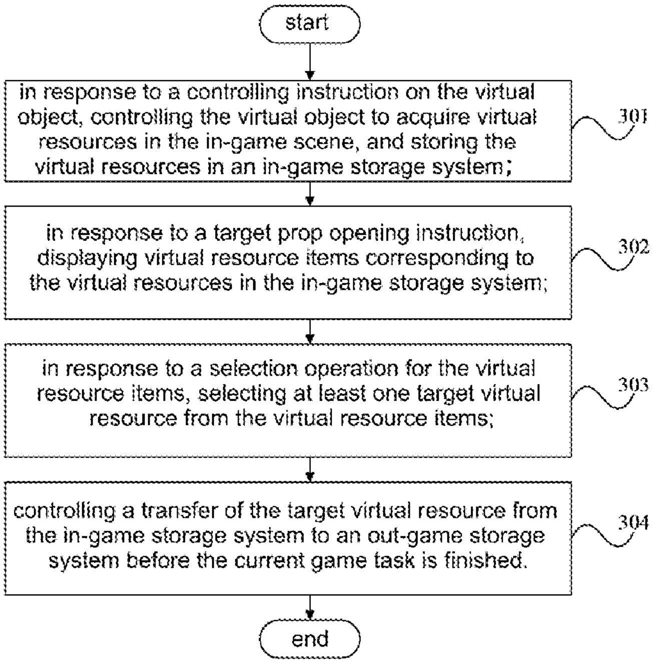
FIG. 3 is a schematic flowchart of a virtual resource transfer method according to an embodiment of the present disclosure.

Please refer to FIG. 3, which shows a virtual resource transfer method in an embodiment of the present disclosure, where the method may be performed by the electronic device 1 shown in FIG. 1 and may be applied to the virtual scene 200 of the FPS game shown in FIG. 2, so as to realize that the player in the round of the game may transfer the target virtual resource picked up in his backpack out of the round of the game in advance at anytime and anywhere by using the target props. The method includes the following steps:

Step 301: in response to a control instruction on the virtual object, controlling the virtual object to acquire the virtual resource in the in-round game scene, and storing the virtual resource in an in-round storage system:

In the present step, the virtual resource may be virtual props such as weapons and medicines, or may be virtual aircrafts with special functions. The in-round game interface corresponding to the current game task may be displayed by the electronic device. The in-round game interface includes the in-round game scene and the virtual object located in the in-round game scene. In the round of the game, the player may control the virtual object to pick up virtual resource in the round of the game scene, such as pick up virtual props dropped by other virtual objects, or pick up virtual resource released by the system, etc., and the virtual resource obtained by the virtual object are stored in the storage system. The in-round storage system is configured to store the virtual resource information in the current in-round game scene. As shown in FIG. 2B. The contents stored in the in-round storage system may include: nearby virtual resource (such as accessories, projectiles, medicines, etc.), virtual resource owned by virtual object A (such as virtual props carried in the backpack 30), and virtual resource which has been already equipped by the virtual object A (such as a virtual weapon 1, an armor, etc.)

Corresponding to the in-round storage system, an out-round storage system may also be included, which is configured to store virtual resource in the out-round game scene. By storing the virtual resource in the in-round game scene separately from the virtual resource in the out-round game scene, the out-round storage system may not participate in data interaction when the player is in the round of the game, which greatly reduces the data access to the out-round storage system during the game process, so that data access efficiency may be improved.

Step 302: in response to a target prop opening instruction, displaying virtual resource item corresponding to the virtual resource in the in-round storage system:

In the present step, the target prop is an in-round virtual prop with the resource transfer function, which may be opened by the players in the in-round game scene. When the target prop is opened, the virtual resource item of the in-round storage system may be displayed in real time, so that the user may visually see which resources may be transferred.

In an embodiment, step 302 may specifically include: in response to the target prop opening instruction entered in the interactive interface, displaying the sub-interface of the target prop in the interactive interface which includes at least one virtual resource item storage area, and displaying the virtual resource item corresponding to the virtual resource in the in-round storage system in the interface.

In the present step, a target prop is a prop that is similar to other virtual resource and may be used in an in-round game scene. When a player participates in a battle in the virtual scene 200, if the player picks up some virtual resource into the backpack in the round of the game, the relevant virtual resource may be transferred out of the round of the game by the target prop. The backpack is a virtual tool owned by the virtual object A that may store virtual goods. Specifically, taking the mobile game as an example, the user's mobile phone screen may display the interactive interface 20 of the virtual scene 200. The interactive interface 20 may be provided with a control of the target prop, or the control of the target prop may be called out through the preset operation gesture, such as two-finger sliding, then the mobile phone may call out a sub-interface of the target prop in respond to the two-finger sliding operation. The sub-interface includes one or more storage areas, which may be configured to store the target virtual resource to be transferred. The virtual resource item corresponding to the virtual resource in the in-round storage system may be displayed near the sub-interface of the target prop in the interactive interface 20. The virtual resource display items may be in the form of text, icon, or graphic combination, and may be classified and displayed according to the category, so that the player may easily identify which virtual resource the virtual resource item is.

In an embodiment, the sub-interface of the target prop may include a plurality of virtual resource item storage areas, so as to facilitate the transfer of a plurality of virtual resources out of the round of the game by the user at once. After the sub-interface pops up, it may be displayed in the center of the interactive interface 20 by default, so as to attract the attention of the player. The player may drag the control box of the sub-interface to start it in other positions of the interactive interface 20. The storage area in the sub-interface may adopt the shape of a plurality of grids, where each of the grids may display a virtual resource item, and the style of the grid may also be customized by the user, for example, it may be configured into circular, oval, or vessel style, etc., to increase the interactive enthusiasm of player to participate in the round of the game.

In an embodiment, the target prop may be delivered according to the rules of the game. For example, it may be randomly dropped in the round of the game itself, may also be subjected to a target prop deliver along with an airdrop box, or may be manufactured in some forms by the player in the round of the game. For example, the target prop is marked as an evacuation prop, the means for the player to manufacture the target prop is as follows: the player enters manufacturing instructions in the interactive interface 20 to call out the manufacturing interface, and the manufacturing interface may display the "evacuation prop" mark, where the means for manufacturing the target prop may be designed according to the game settings. For example, it may be synthesized and manufactured by other props picked up in the round of the game, and may also be manufactured by some point rewards in the round of the game. The player may perform manufacturing by clicking the relevant manufacturing button in the interface. When the manufacturing conditions are insufficient, the manufacturing button is set as gray, which shows the button may not be clicked.

Step 303: in response to a selection operation for the virtual resource item, selecting at least one target virtual resource from the virtual resource item:

In the present step, when the player wants to transfer a virtual resource from in-round to out-round, the player may select the corresponding virtual resource item from the virtual resource item. When the player triggers a selection instruction for a virtual resource item in the virtual resource item, in response to that instruction, the target virtual resource corresponding to the virtual resource item is selected in the in-round storage system. The player may trigger the selection instruction by directly clicking or long pressing the target virtual resource item.

In an embodiment, step 303 may specifically include: in response to a moving instruction for the target virtual resource entered in the interactive interface 20, moving the resource item corresponding to the target virtual resource into the storage area of the target prop.

In the present step, after the target prop is opened in step 302, the user may enter the selection instruction in the interactive interface 20 to select the target virtual resource item to be transferred. The moving instruction may be performed as a player clicking a virtual resource item and dragging it from one location to another, or the player simply double-clicking the virtual resource item, and then the system automatically moving the resource item to the default position of the target prop. For example, selecting an existing target virtual resource from the backpack and clicking to select it, and then dragging the virtual resource item into a storage area in the sub-interface of the target prop, where if the player wants to transfer a plurality of virtual resources, the player may select a plurality of virtual resource items and move them together into a plurality of storage areas of the sub-interface of the target prop.

Step 304: controlling a transfer of the target virtual resource from the in-round storage system to an out-round storage system before the current game task is completed.

In the present step, at the level of the game for player participating, generally, the player transfers virtual resource in the round of the game in the hope that the target virtual resource will not be affected by the following in-round battle. Therefore, it is necessary to transfer the target virtual resource before the current game task is completed to avoid the risk of loss of the target virtual resource after the game task is completed. At the level of computer storage, the transfer of virtual resource from the game to the outside of the game is actually the transfer of the virtual resource from the in-round storage system to the out-round storage system, and when the transfer is completed, the virtual resource no longer occupies the space of the in-round storage system, so that the resources of the in-round storage system are saved, the frequency of data interaction in the round of the game is recued, which improves the computer processing efficiency, and improves the smoothness of the game.

In an embodiment, after placing the target virtual resource item on the target prop, in response to a releasing instruction on the target prop, directly controlling the target virtual resource in the target prop to move, before the current game task is completed, from the in-round storage system to the out-round storage system. The releasing instruction herein may be entered by the user through the interactive interface 20. For example, a releasing button may be set in the sub-interface of the target prop, where the user may directly click the releasing button to trigger the releasing instruction on the target prop. The releasing instruction may also be automatically triggered and generated by specific events, for example, when the opening duration reaches a certain duration, the releasing instruction on the target prop may be generated. A variety of triggering manners may not only increase the interest of the game, but also improve the function of the interactive interface, thereby improving the performance of the computer in displaying information to interact with the user.

In the above virtual resource transfer method, by adding a target prop, the player in the round of the game may select the target virtual resource from the virtual resource picked up in their backpacks. By using the target prop, the target virtual resource picked up in the player's backpack may be moved to the out-round storage system before the current game is completed, so as to avoid the risk that the virtual resource obtained by the player in the round of the game may be lost in the current game. In the practical scene, the player may decide whether to transfer according to the current material equipment situation. The player who uses the virtual resource transfer mode may choose to go to the designated evacuation location for conventional transfer, or wait to win the current game and then transfer, or the player may also choose to transfer through the above target prop according to their demands. A variety of virtual resource transfer methods enrich the game content and increase the participation enthusiasm of the user. When the player chooses to transfer the virtual resource from in-round to out-round of the game by using the above target prop, the risk of ending up with nothing due to an over long time playing and eventual death in a single game may be reduced, and at the same time, the game becomes more competitive, the players compete for props, so that more interesting content output is generated. It not only reduces the risk of the game, but also enriches the types of virtual resource, which enriches and varies the gameplay, and increases the novice friendliness and game fun.

At the computer storage level, by configuring two storage systems: in-round storage system and out-round storage system, where the in-round storage system is configured to store the virtual resource of the in-round game scene, and the out-round storage system is configured to store the virtual resource in the out-round game scene, when the virtual resource is transferred from in-round to out-round of the game, the virtual resource is actually transferred from the in-round storage system to the out-round storage system. After the transfer is completed, the virtual resource no longer occupies the space of the in-round storage system, so that the resources of the in-round storage system is reduced, which improves the computer processing efficiency, and improves the smoothness of the current game.

Figure 4:
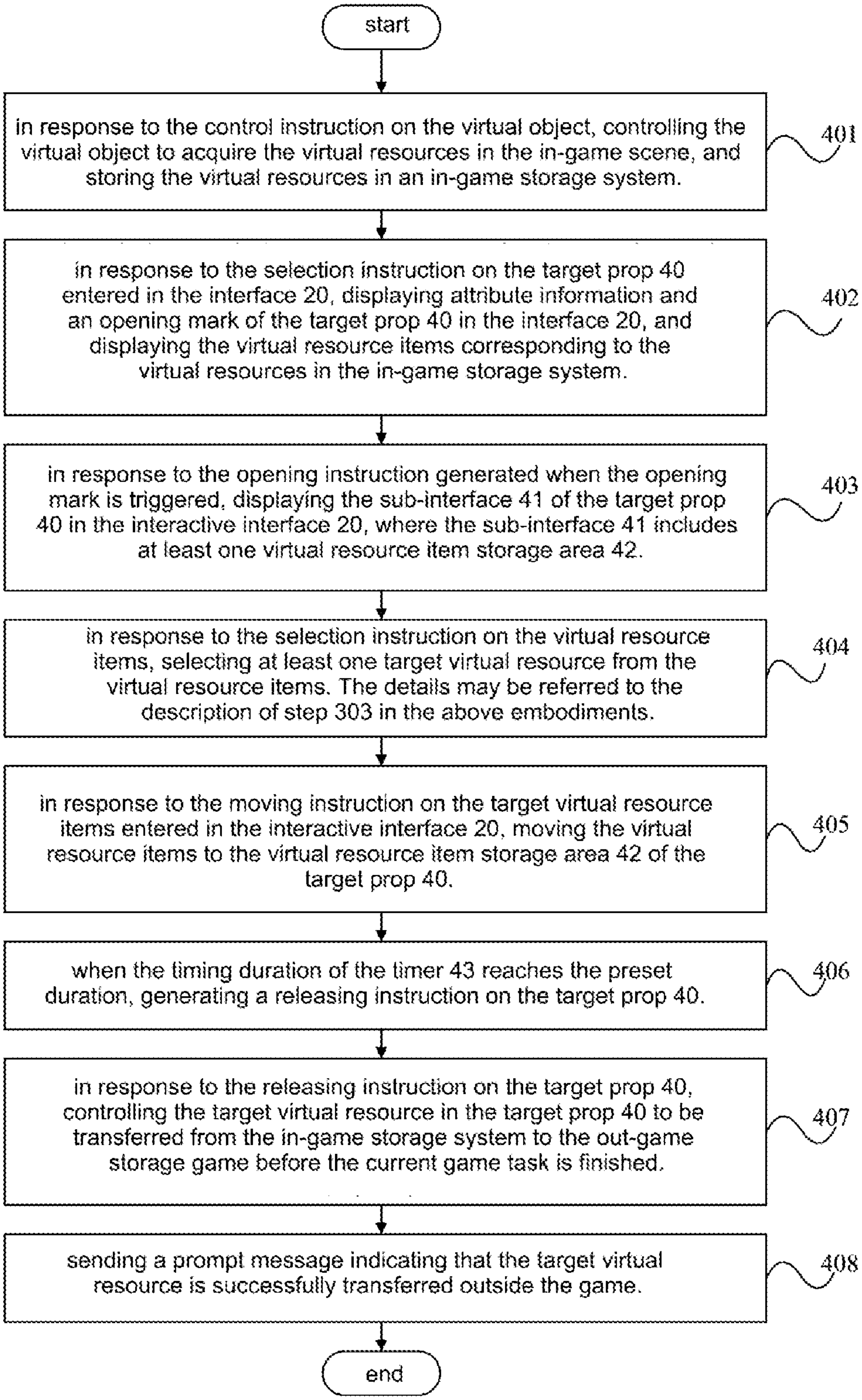
FIG. 4 is a schematic flowchart of the virtual resource transfer method according to an embodiment of the present disclosure.

Please refer to FIG. 4, which shows a virtual resource transfer method in an embodiment of the present disclosure, where the method may be performed by the electronic device 1 shown in FIG. 1 and may be applied to the virtual scene 200 of the FPS game shown in FIG. 2, so as to realize that the player in the round of the game may transfer the target virtual resource picked up in the player's backpack 30 out of the round of the game in advance at anytime and anywhere by using the target prop 40. The method includes the following steps:

Step 401: in response to the control instruction on the virtual object, controlling the virtual object to acquire the virtual resource in the in-round game scene, and storing the virtual resource in an in-round storage system. The details may be referred to the description of step 301 in the above embodiments.

Step 402: in response to the selection instruction on the target prop 40 entered in the interactive interface 20, displaying attribute information and an opening mark of the target prop 40 in the interactive interface 20, and displaying the virtual resource item corresponding to the virtual resource in the in-round storage system.

Figure 5A:
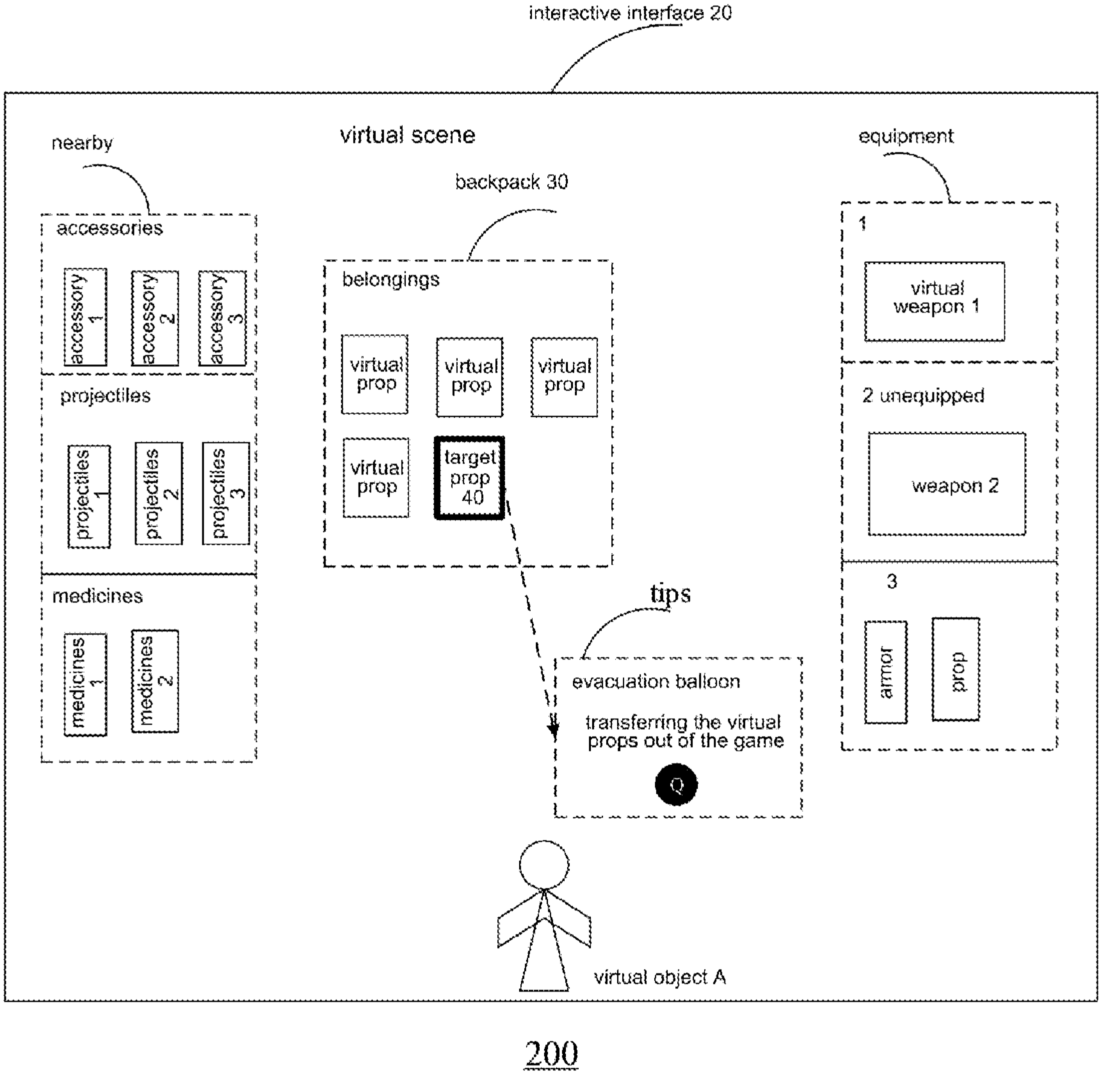
FIG. 5A is a schematic diagram of a virtual resource transfer process according to an embodiment of the present disclosure.

In the present step, taking the virtual resource in the in-round storage system being the virtual props in the backpack as an example, when the virtual object A controlled by the user owns the target prop 40, such as it picks up the target prop 40 randomly dropped by the system, the target prop 40 may be placed in the backpack 30. When the player wants to use the target prop 40, first, the player opens an interface of the backpack 30, as shown in FIG. 5A, the interface of the backpack 30 may display the target prop 40 and other virtual prop items owned by the virtual object A. The user may click the target prop 40 through the interface, and then select the target prop 40. In response to the selection instruction, the attribute information and the opening mark of the target prop 40 may be displayed in the interactive interface 20. The attribute information may include the name of the target prop 40 and the effect after use, and the opening mark may be an opening button.

In an embodiment, the target prop 40 may be packaged as an evacuation balloon, and when the backpack 30 is opened, a mark for the evacuation balloon may be displayed in the backpack 30, as shown in FIG. 5A. For example, it may be in the shape of a balloon. When the user selects the target prop 40, for example, when the player clicks the target prop 40, a floating tip may appear near the target prop 40, informing the player of the specific prop name of the target prop (i.e., the evacuation balloon) and the effect after use (i.e., the virtual resource is transferred out of the round of the game), and at the same time, there may be an opening button Q on the tips.

Step 403: in response to the opening instruction generated when the opening mark is triggered, displaying the sub-interface 41 of the target prop 40 in the interactive interface 20, where the sub-interface 41 includes at least one virtual resource item storage area 42.

Figure 5B:
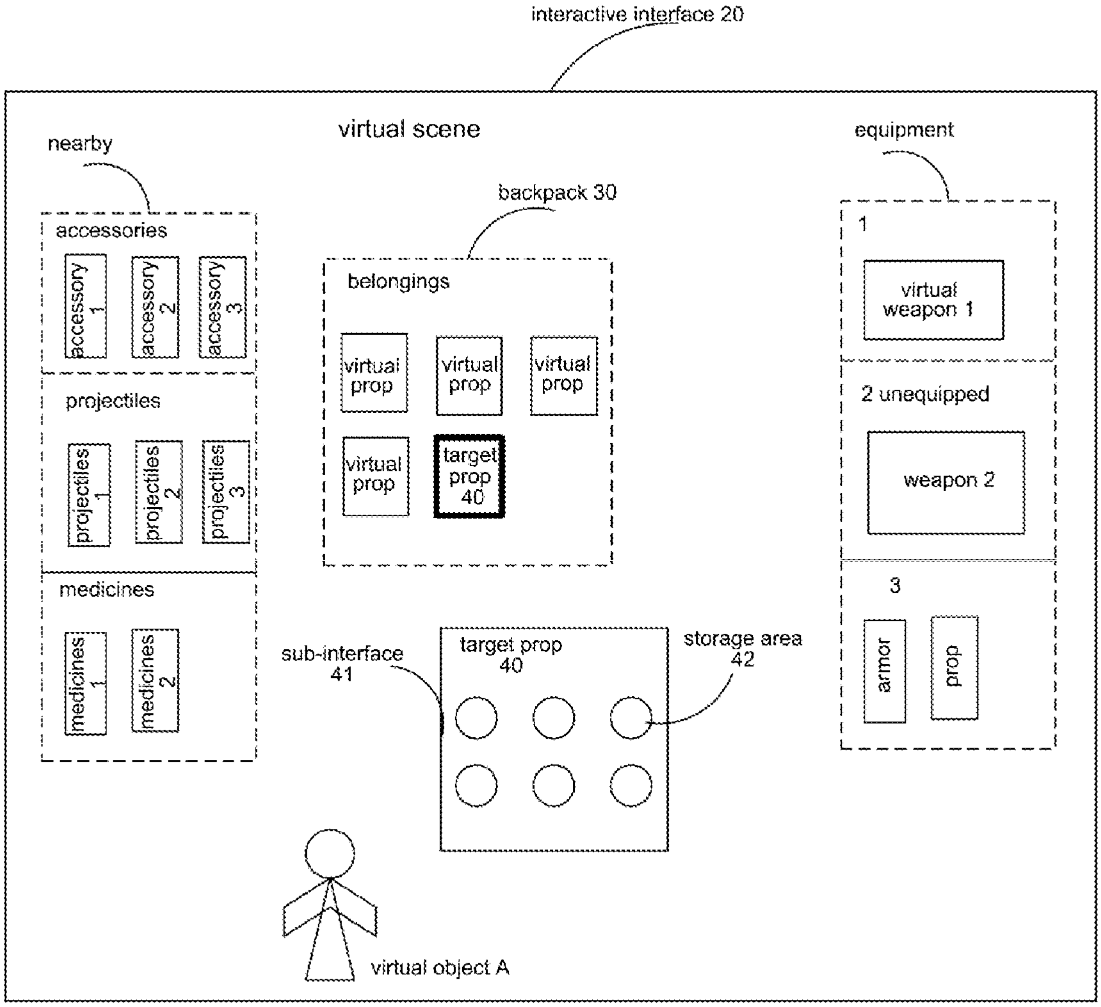
FIG. 5B is a schematic diagrams of a virtual resource transfer process according to an embodiment of the present disclosure.

In the present step, the player may trigger the opening instruction on the target prop 40 by clicking the opening button Q as shown in FIG. 5A, and the system may respond by displaying the sub-interface 41 of the target prop 40 in the interactive interface. The sub-interface 41 includes a prop storage area 42, as shown in FIG. 5B, where one target prop 40 may be configured with a plurality of virtual resource item storage areas 42, and one virtual resource item can be placed in one storage area 42, for example, there are six storage areas in FIG. 5B.

In an embodiment, the player may also activate the button Q by double-clicking, long-pressing, etc., to trigger the opening instruction, or the user may trigger in a custom way. A plurality of triggering ways may improve the interactive performance of the computer.

Figure 5C:
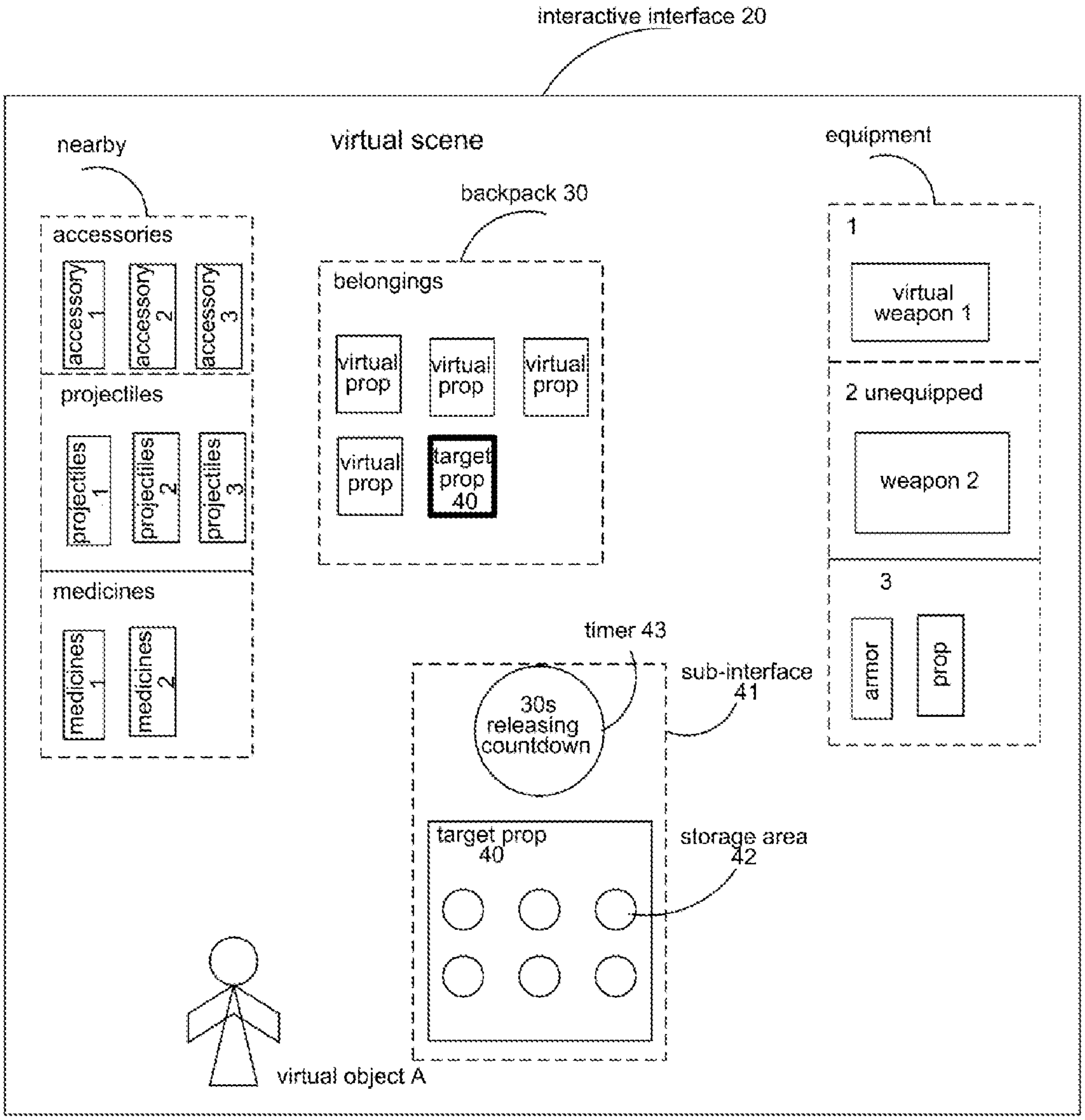
FIG. 5C is a schematic diagrams of a virtual resource transfer process according to an embodiment of the present disclosure.

In an embodiment, a limited countdown may be set for each target prop 40, where the countdown is configured to specify that the player must place the to-be-transferred props in the target prop 40 in a limited time. As shown in FIG. 5C, the sub-interface 41 may further include a prompt box of timer 43 of the target prop 40, so as to inform the player that the player needs to drag the to-be-transferred target virtual resource item into the storage area 42 in the limited time, such as a preset duration of 30 seconds, then a 30-seconds release countdown may be prompted. The player may release the balloon and then place the prop that can be picked up in the evacuation balloon prop. It increases the convenience of user interaction with the graphical user interface and improves the interactive performance of the computer.

Step 404: in response to the selection instruction on the virtual resource item, selecting at least one target virtual resource from the virtual resource item. The details may be referred to the description of step 303 in the above embodiments.

Step 405: in response to the moving instruction on the target virtual resource item entered in the interactive interface 20, moving the virtual resource item to the virtual resource item storage area 42 of the target prop 40.

In the present step, the user may enter the selection instruction on the virtual resource item in the backpack 30 in the interactive interface 20, and select the target virtual resource to be transferred, for example, select an existing target virtual resource item from the backpack 30 and then drag the target virtual resource item into a storage area 42 in the sub-interface 41 of the target prop 40. If the player wants to move a plurality of target virtual resources, then the player may select a plurality of target virtual resource items and move them together to a plurality of storage areas 42 in the sub-interface 41 of the target prop 40.

Step 406: when the timing duration of the timer 43 reaches the preset duration, generating a releasing instruction on the target prop 40.

In the present step, the sub-interface 41 further includes the prompt box of the timer 43 of the target prop, which may be displayed on an upper edge of the sub-interface and may be in an eye-catching shape, such as a dynamic time bar, to attract the attention of the player; when the timing duration of the timer 43 reaches the preset duration, for example, after the timing duration reaches 30 seconds, the releasing instruction on the target prop 40 may be triggered automatically.

Figure 5D:
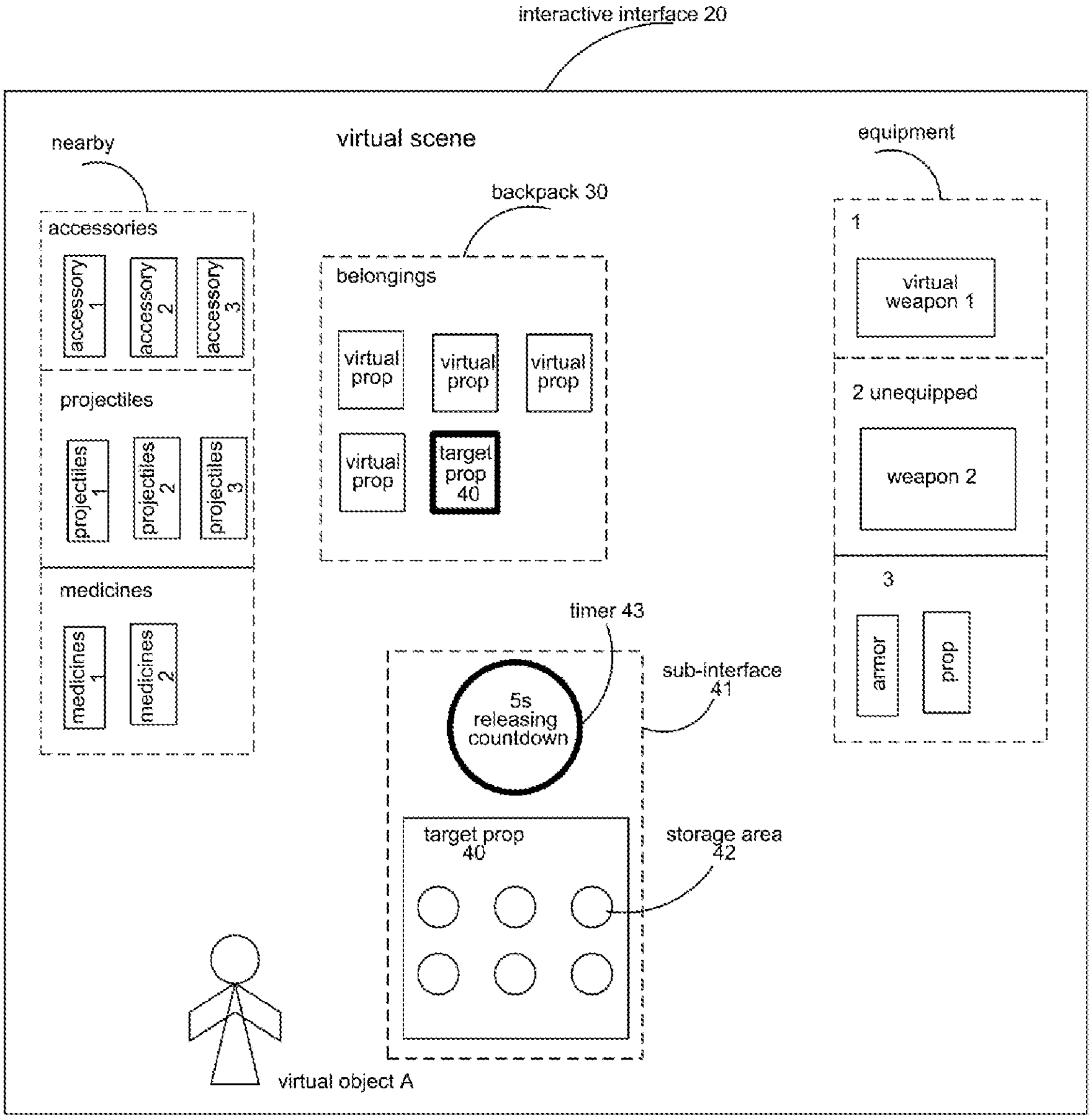
FIG. 5D is a schematic diagrams of a virtual resource transfer process according to an embodiment of the present disclosure.

In an embodiment, a prompt message is sent when a first duration is left between the timing duration of the timer 43 and the preset duration, where the first duration is less than the preset duration. The preset duration may be set based on the practical requirements of the game rules. Assuming the preset duration is 30 seconds, the first duration may be 5 seconds or 3 seconds. For example, as shown in FIG. 5D, when the countdown remains 5 seconds, the interface may prompt in a red color, for example, the timer 43 flashes red, reminding the player that there is not much time left, and it is necessary to hurry up to drag the target virtual resource item into the storage area 42. Certainly, the remaining time prompts here may be in other forms, such as voice or text prompts.

Step 407: in response to the releasing instruction on the target prop 40, controlling the target virtual resource in the target prop 40 to be transferred from the in-round storage system to the out-round storage system before the current game task is completed.

In the present step, after the releasing instruction on the target prop 40 is generated, in response to the releasing instruction, the system controls the target virtual resource in the target prop 40 to move outside the game. The target virtual resource may be transferred to the storage system outside the game. The transferred props no longer appears in the backpack 30 of the player, therefore a lot of space in the backpack 30 of the player in the round of the game may be freed, that is, the virtual resource is transferred from the in-round storage system to the out-round storage system, and after the transfer is completed, the virtual resource no longer occupies the space of the in-round storage system, so that the resources of the in-round storage system are saved, thereby improving the computer processing efficiency, and the smoothness of the current game. Taking an online game as an example, the code of the game server may record id information of these target virtual resource, and wait for the settlement of the game, then the target virtual resource is brought out for the players to review the settlement results.

Step 408: sending a prompt message indicating that the target virtual resource is successfully transferred outside the game.

Figure 5E:
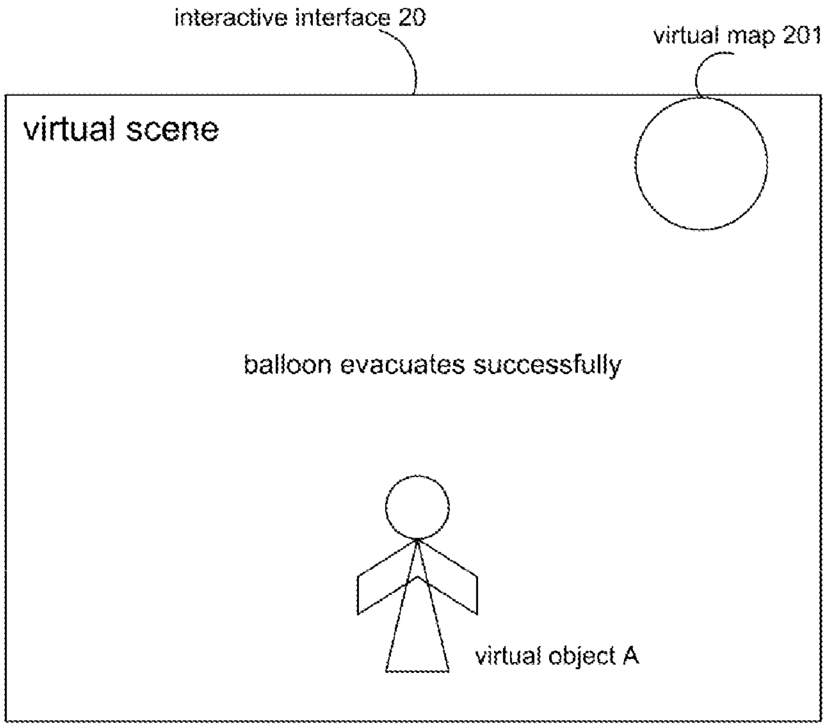
FIG. 5E is a schematic diagrams of a virtual resource transfer process according to an embodiment of the present disclosure.

In the present step, the transfer process of step 405 is automatically completed in the system, and the user may not perceive it. In order to maintain a better sense of interaction with the user, when the target virtual resource is successfully transferred, a prompt may be given in the interactive interface 20 for the user to check the transfer result. The prompt may be in voice, text, color, or video, etc., for example, as shown in FIG. 5E, the intuitive result that the user may see is that after the countdown ends, the tips may pop up in the interactive interface 20 to inform the player that the balloon is successfully evacuated, that is, the props are successfully transferred.

In the above virtual resource transfer method, by adding the target prop 40 to the regular virtual resource transfer method, the player in the round of the game may move the target virtual resource picked up in the backpack 30 of the player to the prop storage area 42 of the target prop 40 in advance by using the target prop 40, and then release the target prop 40, so that the target virtual resource may be transferred to outside the game. The player may decide whether to transfer according to the current material equipment situation, and the player may find a safe place for strategic deployment, and may also immediately deploy to perform an adjustment.

The virtual resource transfer method in the present embodiment includes both the current prop evacuation method and the two traditional methods mentioned above. If the player wants to transfer in a regular way, the player may also transfer the virtual resource to the designated evacuation location, or the player may wait until winning the current game and then complete the prop transfer. A plurality of virtual resource transfer mode may offer more selectivity for the player, increasing the convenience for the user to interact with the graphical user interface, and improving the computer interaction performance.

Figure 6:
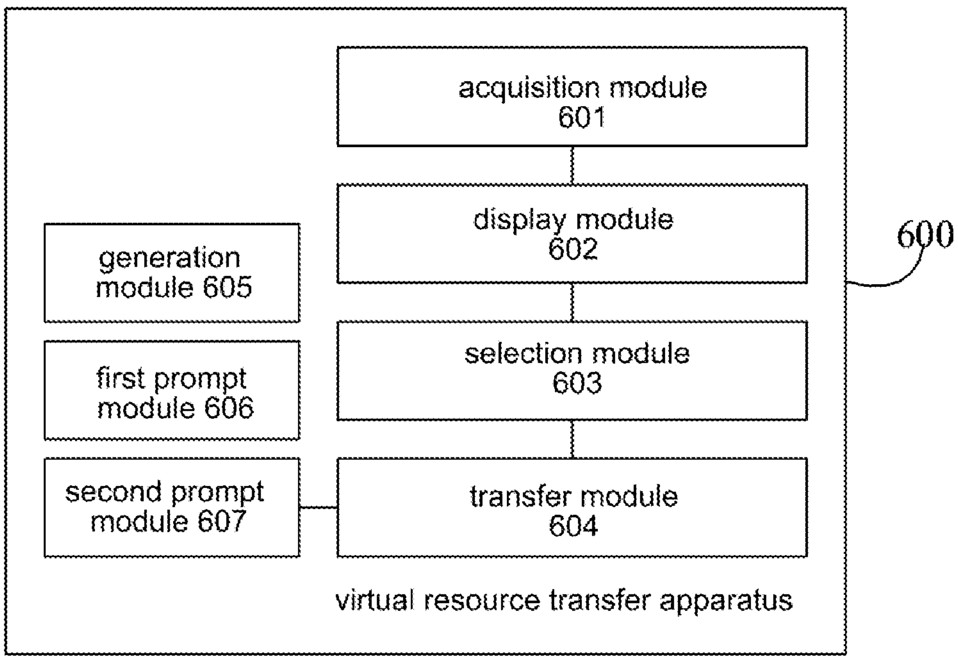
FIG. 6 is a schematic structural diagram of a virtual resource transfer apparatus according to an embodiment of the present disclosure.

Please refer to FIG. 6, which shows a virtual resource transfer apparatus 600 according to an embodiment of the present disclosure, the apparatus may be applied to the electronic device 1 shown in FIG. 1, and may be applied to the virtual scene 200 of the FPS game as shown in FIG. 2. Herein, an in-round game interface corresponding to the current game task is displayed by the electronic device 1. The in-round game interface includes an intra-game scene and a virtual object located in the intra-game scene, so as to enable an player in the round of the game to transfer a target virtual resource picked up in his/her backpack 30 out of the round of the game in advance at anytime and anywhere by using the target prop 40. The transfer of props may be accomplished without requiring the player to go to a designated evacuation location or wait to win the current game. The apparatus includes: an acquisition module 601, a display module 602, a selection module 603 and a transfer module 604, where the principal relationships of the respective modules are as follows:

an acquisition module 601, configured for, in response to a control instruction on the virtual object, controlling the virtual object to acquire the virtual resource in the in-round game scene, and storing the virtual resource in an in-round storage system;

a display module 602, configured for, in response to a target prop opening instruction, displaying virtual resource item corresponding to the virtual resource in the in-round storage system;

a selection module 603, configured for, in response to a selection operation for the virtual resource item, selecting at least one target virtual resource from the virtual resource item; and a transfer module 604 configured for, controlling the transfer of the target virtual resource from the in-round storage system to the out-round storage system before the current game task is completed.

In an embodiment, the displaying module 602 is configured for, in response to the target prop opening instruction entered in the interactive interface, displaying the sub-interface of the target prop in the interactive interface which includes at least one virtual resource item storage area, and displaying the virtual resource item corresponding to the virtual resource in the in-round storage system in the interface.

In an embodiment, displaying the sub-interface of the target prop including at least one virtual resource item storage area in the interactive interface in response to the target prop opening instruction entered in the interactive interface includes: in response to the selection instruction on the target prop entered in the interactive interface, displaying attribute information and an opening mark of the target prop in the interface; and in response to the opening instruction generated when the opening mark is triggered, displaying the sub-interface of the target prop in the interactive interface, where the sub-interface includes at least one virtual resource item storage area.

In an embodiment, the transfer module 604 is configured for, in response to a moving instruction on the target virtual resource item entered in the interactive interface, moving the target virtual resource item to the virtual resource item storage area of the target prop; and in response to a releasing instruction on the target prop, controlling the target virtual resource in the target prop to be transferred from the in-round storage system to the out-round storage system before the current game task is completed.

In an embodiment, the sub-interface further includes the timer prompt box of the target prop; and the apparatus includes: a generation module 605, configured for generating the releasing instruction on the target prop when a timing duration of the timer reaches a preset duration.

In an embodiment, the apparatus further includes: a first prompt module 606, configured for sending a prompt message when there is a first duration left between the timing duration of the timer and the preset duration, where the first duration is less than the preset duration.

In an embodiment, the apparatus further includes: a second prompt module 607, configured for sending a prompt message indicating that the target virtual resource is transferred successfully, after the operation of controlling the transfer of the target virtual resource from the in-round storage system to the out-round storage system before the current game task is completed.

For the detailed description of the virtual resource transfer apparatus 600, please refer to the description of the relevant method steps in the above embodiments.

The embodiment of the present disclosure further provides a non-transitory electronic device readable storage medium, including: a programs, when run by an electronic device, enables the electronic device to perform the method in the embodiment described above:

- in response to a controlling instruction on the virtual object, controlling the virtual object to acquire the virtual resource in the in-round game scene, and storing the virtual resource in an in-round storage system;
- in response to a target evacuation prop opening instruction entered in the interactive interface, displaying virtual resource item corresponding to the virtual resource in the in-round storage system;
- displaying the sub-interface of the evacuation props in the interactive interface, where the sub-interface includes a prop storage area;
- in response to a selection operation for the virtual resource item, selecting at least one target virtual resource from the virtual resource item;
- in response to the moving instruction on the target virtual prop entered in the interactive interface, moving the target virtual prop into the prop storage area of the evacuation props; and
- in response to the releasing instruction on the evacuation props, controlling the target virtual resource prop in the evacuation props to transfer from the in-round storage system to the out-round storage system before the current game task is completed.

In an embodiment, displaying the virtual resource item corresponding to the virtual resource in the in-round storage system in response to the target prop opening instruction includes: in response to the target prop opening instruction entered in the interactive interface, displaying the sub-interface of the target prop including at least one virtual resource item storage area in the interactive interface, and displaying the virtual resource item corresponding to the virtual resource in the in-round storage system in the interactive interface.

In an embodiment, displaying the sub-interface of the target prop including at least one virtual resource item storage area in the interactive interface in response to the target prop opening instruction entered in the interactive interface includes: in response to the selection instruction on the target prop entered in the interactive interface, displaying attribute information and an opening mark of the target prop in the interactive interface; and in response to the opening instruction generated when the opening mark is triggered, displaying the sub-interface of the target prop in the interactive interface, where the sub-interface includes at least one virtual resource item storage area.

In an embodiment, controlling the transfer of the target virtual resource from the in-round storage system to the out-round storage system before the current game task is completed includes: in response to a moving instruction on the target virtual resource entered in an interactive interface, moving the target virtual resource into a virtual resource item storage area of a target agent; and in response to a releasing instruction on the target prop, controlling the target virtual resource in the target prop to be transferred from the in-round storage system to the out-round storage system before the current game task is completed.

In an embodiment, the sub-interface further includes a timer prompt box of the target prop; the method includes: generating a releasing instruction on the target prop when the timing duration of the timer reaches a preset duration.

In an embodiment, the method further includes: sending a prompt message when there is a first duration left between the timing duration of the timer and a preset duration, where the first duration is less than the preset duration.

In an embodiment, controlling the transfer of the target virtual resource from the in-round storage system to the out-round storage system before the current game task is completed includes: sending a prompt message indicating that the target virtual resource is successfully transferred.

In the virtual resource transfer method, apparatus, device and storage medium provided by the present disclosure, by adding a target prop, the player in the round of the game may select the target virtual resource from the virtual resource picked up in the player's backpack, and move the target virtual resource picked up in the player's backpack to the out-round storage system before the current game is completed by using the target prop, so as to avoid the risk that virtual resource acquired by the player in the round of the game may be lost in the current game. In the practical scene, the player may decide whether to transfer according to the current material equipment situation. The player who uses the virtual resource transfer mode may choose to go to the designated evacuation location for conventional transfer, or wait to win the current game and then transfer, or the player may also choose to transfer through the above target prop according to their demands. A variety of virtual resource transfer methods enrich the game content and increase the participation enthusiasm of the user. In addition, after the virtual resource is transferred from the in-round storage system to the out-round storage system, the virtual resource no longer occupies the space of the in-round storage system, so that the resources of the in-round storage system are saved, improving the computer processing efficiency and the smoothness of the current game.

In the above, the storage medium may be a magnetic disk, an optical disk, a read-only memory (ROM), a random-access memory (RAM), a flash memory, a hard disk drive (abbreviated as HDD), a solid-state drive (SSD), or the like. The storage medium may also include a combination of the above-mentioned kinds of memories.

Although the embodiments of the present disclosure have been described in conjunction with the accompanying drawings, various modifications and variations may be made by those skilled in the art without departing from the spirit and scope of the present disclosure, and all such modifications and variations belong to the scope defined by the appended claims.

The invention claimed is:

1. A virtual resource transfer method, comprising:

in response to a controlling instruction on a virtual object, controlling, by an electronic device, the virtual object to acquire virtual resource in an in-round game scene, and storing the virtual resources in an in-round storage system, wherein an in-round game interface displayed by the electronic device corresponds to a current game task, the in-round game interface comprises the in-round game scene, and the virtual object located in the in-round game scene;

in response to an opening instruction on a target prop, displaying a virtual resource item corresponding to the virtual resource in the in-round storage system;

in response to a selection operation on the virtual resource items, selecting at least one target virtual resource from the virtual resource item; and controlling a transfer of the target virtual resource from the in-round storage system to an out-round storage system before the current game task is completed.

2. The method according to claim 1, wherein in response to the opening instruction on the target prop, displaying virtual resource items corresponding to the virtual resource in the in-round storage system further comprises:

in response to opening instruction on the target prop entered in an interactive interface, displaying a sub-interface of the target prop in the interactive interface of the electronic device, wherein the sub-interface comprises at least one virtual resource item storage area; and displaying, in the interactive interface, the virtual resource item corresponding to the virtual resource in the in-round storage system.

3. The method according to claim 2, wherein in response to the opening instruction on the target prop entered in the interactive interface, displaying the sub-interface of the target prop in the interactive interface further comprises:

in response to a selection instruction on the target prop entered in the interactive interface of the electronic device, displaying attribute information and an opening mark of the target prop in the interactive interface; and in response to an opening instruction generated when the opening mark is triggered, displaying the sub-interface of the target prop in the interactive interface, wherein the sub-interface comprises the at least one virtual resource item storage area.

4. The method according to claim 2, wherein controlling the transfer of the target virtual resource from the in-round storage system to the out-round storage system before the current game task is completed further comprises:

in response to a moving instruction on the target virtual resource entered in the interactive interface, moving the target virtual resource item to the virtual resource item storage area of the target prop; and in response to a releasing instruction on the target prop, controlling the target virtual resource in the target prop to be transferred from the in-round storage system to the out-round storage system before the current game task is completed.

5. The method according to claim 4, wherein the sub-interface further comprises a timer prompt box of the target prop, and wherein the method comprises:

generating the releasing instruction on the target prop in response to determining that a timing duration of the timer reaches a preset duration.

6. The method according to claim 5, wherein the method further comprises:

sending a prompt message in response to determining that a first duration is left between the timing duration of the timer and the preset duration, wherein the first duration is less than the preset duration.

7. The method according to claim 1, wherein the method further comprises:

sending a prompt message indicating that the target virtual resource is transferred successfully.

8. The method according to claim 1, wherein the virtual object comprises an active object and an inactive object, the active object comprises at least one of a virtual person, a virtual animal, or a virtual vehicle, and the inactive object comprises at least one of a virtual plant, a virtual mountain forest, or a virtual river.

9. The method according to claim 2, wherein the interactive interface comprises a virtual operation control, and the virtual operation control is configured to control a motion state of the virtual object.

10. The method according to claim 1, wherein the sub-interface comprises a prop storage area.

11. The method according to claim 4, wherein the releasing instruction is entered by a user through the interactive interface, or is automatically triggered and generated by a specific event.

12. An electronic device, comprising:

a memory, configured for storing a computer program; and a processor, configured for executing the computer program to implement a virtual resource transfer method, with the virtual resource transfer method comprising:

in response to a controlling instruction on a virtual object, controlling the virtual object to acquire virtual resource in an in-round game scene, and storing the virtual resource in an in-round storage system, wherein an in-round game interface displayed by the electronic device corresponds to a current game task, the in-round game interface comprises the in-round game scene, and the virtual object located in the in-round game scene;

in response to an opening instruction on a target prop, displaying a virtual resource item corresponding to the virtual resource in the in-round storage system;

in response to a selection operation on the virtual resource item, selecting at least one target virtual resource from the virtual resource item; and controlling a transfer of the target virtual resource from the in-round storage system to an out-round storage system before the current game task is completed.

13. The electronic device according to claim 12, wherein the virtual object comprises an active object and an inactive object, the active object comprises at least one of a virtual person, a virtual animal, or a virtual vehicle, and the inactive object comprises at least one of a virtual plant, a virtual mountain forest, or a virtual river.

14. The electronic device according to claim 12, wherein the sub-interface comprises a prop storage area.

15. The electronic device according to claim 12, wherein the releasing instruction is entered by a user through the interactive interface, or is automatically triggered and generated by a specific event.

16. A non transitory electronic device readable storage medium, comprising: a program, when run by an electronic device, enables the electronic device to implement a virtual resource transfer method, with the virtual resource transfer method comprising:

in response to a controlling instruction on a virtual object, controlling the virtual object to acquire virtual resource in an in-round game scene, and storing the virtual resource in an in-round storage system, wherein an in-round game interface displayed by the electronic device corresponds to a current game task, the in-round game interface comprises the in-round game scene, and the virtual object located in the in-round game scene;

in response to an opening instruction on a target prop, displaying a virtual resource item corresponding to the virtual resource in the in-round storage system;

in response to a selection operation on the virtual resource item, selecting at least one target virtual resource from the virtual resource item; and controlling a transfer of the target virtual resource from the in-round storage system to an out-round storage system before the current game task is completed.

17. The non-transitory electronic device readable storage medium according to claim 16, wherein in response to the opening instruction on the target prop, displaying virtual resource item corresponding to the virtual resource in the in-round storage system further comprises:

in response to the opening instruction on the target prop entered in an interactive interface of an electronic device, displaying a sub-interface of the target prop in the interactive interface, wherein the sub-interface comprises at least one virtual resource item storage area; and displaying, in the interactive interface, the virtual resource item corresponding to the virtual resource in the in-round storage system.

18. The non-transitory electronic device readable storage medium according to claim 17, wherein in response to the opening instruction on the target prop entered in the interactive interface, displaying the sub-interface of the target prop in the interactive interface further comprises:

in response to a selection instruction on the target prop entered in the interactive interface of the electronic device, displaying attribute information and an opening mark of the target prop in the interactive interface; and in response to an opening instruction generated when the opening mark is triggered, displaying the sub-interface of the target prop in the interactive interface, wherein the sub-interface comprises the at least one virtual resource item storage area.

19. The non-transitory electronic device readable storage medium according to claim 18, wherein controlling the transfer of the target virtual resource from the in-round storage system to the out-round storage system before the current game task is completed further comprises:

in response to a moving instruction on the target virtual resource entered in the interactive interface, moving the target virtual resource item to the virtual resource item storage area of the target prop; and in response to a releasing instruction on the target prop, controlling the target virtual resource in the target prop to be transferred from the in-round storage system to the out-round storage system before the current game task is completed.

20. The non-transitory electronic device readable storage medium according to claim 18, wherein the sub-interface further comprises a timer prompt box of the target prop, and wherein the method comprises:

generating the releasing instruction on the target prop in response to determining that a timing duration of the timer reaches a preset duration.

* * * * *